S. TAYLOR.
ANIMAL TRAP.
APPLICATION FILED APR. 14, 1916.
1,243,008.
Patented Oct. 16, 1917.
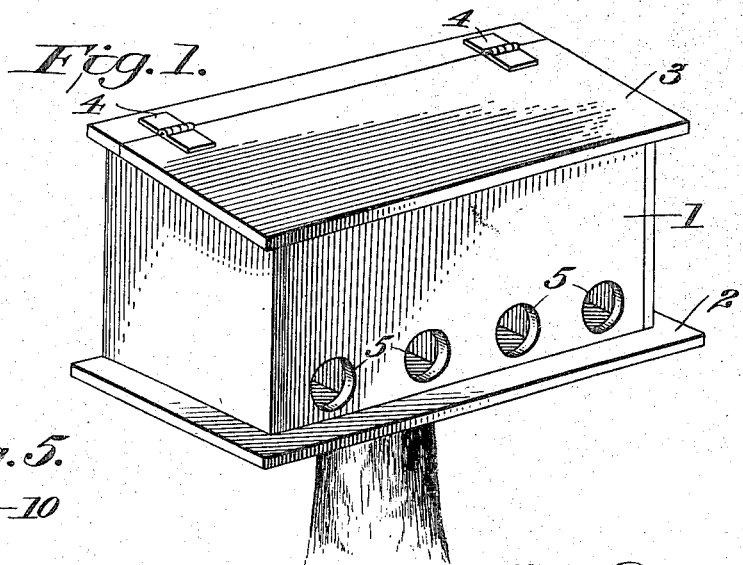
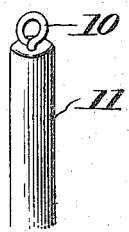
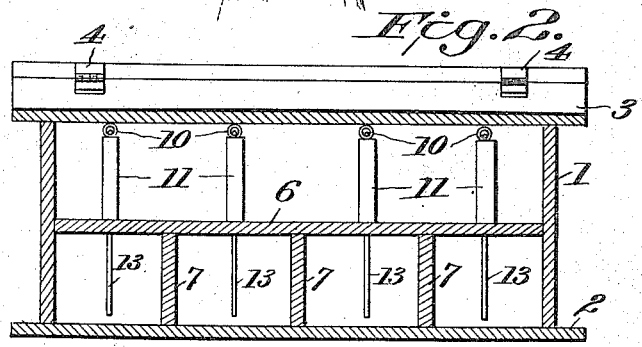
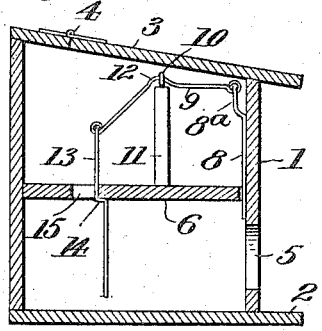
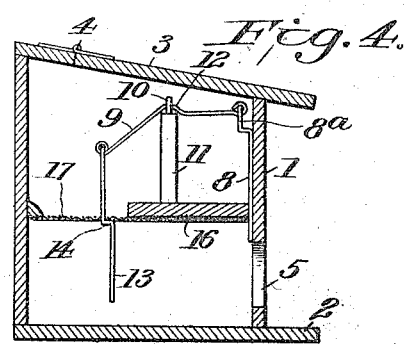
Inventor,
Sam Taylor.
By G. Howlett Davis
Attorney

UNITED STATES PATENT OFFICE.

SAM TAYLOR, OF MORGANTON, NORTH CAROLINA.

ANIMAL-TRAP.

1,243,008.  Specification of Letters Patent.  Patented Oct. 16, 1917.

Application filed April 14, 1916. Serial No. 91,048.

*To all whom it may concern:*

Be it known that I, SAM TAYLOR, a citizen of the United States, residing at Morganton, in the county of Burke and State of North Carolina, have invented certain new and useful Improvements in Animal-Traps, of which the following is a specification.

This invention relates to animal traps, and especially to that class of traps constructed to catch the animal without killing or injuring it.

The objects of the invention are to provide a trap of this character which shall be simple in construction, attractive in appearance, efficient in operation, proof against all weather conditions, and adapted for catching birds, as well as animals.

With these ends in view, my invention consists in the construction, arrangement and combination of parts hereinafter described, and illustrated in the accompanying drawings, forming part of this specification, and in which, Figure 1 is a perspective view of my improved trap, as it appears when arranged for catching birds;

Fig. 2 is a longitudinal vertical section through the same;

Fig. 3 is a transverse section through the trap;

Fig. 4 is a similar view showing a slightly modified construction; and,

Fig. 5 is a fragmentary, perspective view showing one of the details.

Referring to the drawings, my improved trap comprises a box 1, which may be of rectangular or other suitable shape, and is provided with a bottom 2, which preferably projects beyond the sides so as to form a ledge. The box is provided with a sloping top or cover 3, attached at the rear by means of hinges 4. The cover also extends beyond the sides of the box so as to form a drip or eaves, as clearly shown in Fig. 3.

The inside of the box is divided into upper and lower chambers by means of a horizontal partition 6. The lower chamber is again sub-divided into a plurality of compartments by means of a series of vertical partitions 7. Openings 5, preferably circular, as shown, are formed in the front wall of the box, one such opening being provided for each of the above mentioned compartments and constituting the only means of communication with such compartments.

Each of the openings 5 is adapted to be closed by means of the sliding gravity operated door 8, preferably formed of sheet metal, and working against the inner face of the front wall of the box. The front edge of the partition 6 is cut so as to provide suitable spaces for the reception of the doors 8, and thus acts as a guide to maintain such doors in proper position.

The upper end of each door is preferably off-set, as shown at 8ª, and is pivotally attached to one end of a beam 9. This beam passes through an eye 10, set into the upper end of a post 11, supported upon the partition 6, and the beam is preferably formed with a curved or arch-shaped portion 12 at the point of engagement with said eye so as to prevent longitudinal sliding of the beam while the trigger is set, but readily allows it to slide through the eye 10, when the trap is sprung.

The rear end of the beam is bent downwardly, as shown, and pivotally secured to a trigger 13, such downward bending preventing interference with the beam by the roof or cover, and also making it impossible for an animal to move the door by pulling on the trigger. The trigger 13 is provided with a notch or shoulder 14, and extends downwardly to a point near the bottom of the box. The trigger passes through an opening 15 in the partition 6, and the shoulder is adapted to engage under the edge of such opening. The shape of the beam makes it impossible to set it upside down, with the trigger backward. Both the beam 9 and trigger 13 can conveniently be made of stiff wire, bent as shown.

In some cases, especially where the trap is used for catching certain kinds of animals, I may construct the partition as shown in Fig. 4. By reference to this figure, it will be seen that the partition comprises a piece of wire mesh having the board 16 overlying the same, but extending only part of the way across, whereby the rear portion 17 of the partition is foraminous, consisting of the wire mesh only. In this case the trigger passes down through a mesh of the wire and engages therewith. With this construction, it is also possible to place bait on top of the wire mesh back of the trigger. By this means, the bait serves to attract animals to the trap, but cannot be reached by them.

In my improved trap constructed as above described, it will be particularly observed that the doors and trigger mechanisms are entirely inclosed within the box. This serves to protect them from the weather and to prevent accidental throwing of the trap. Moreover, the fact that all working parts are entirely inclosed makes it possible to conceal the trap by covering it with straw or other litter. When the trap is mounted upon a post, as shown in Fig. 1, the projecting floor 2 and sloping roof 3 give it an attractive appearance very similar to that of a bird-house.

What I claim is:

1. A trap comprising a box having a horizontal partition extending across the same and dividing it into upper and lower chambers, the lower chamber comprising a plurality of compartments, and each compartment having an opening cut through the front wall of the box, a vertically sliding gravity door for closing each opening, a beam and trigger for each door, and a post carried by said partition for supporting the beam, the rear end of said beam carrying the trigger, said partition having an opening through which said trigger extends, a forwardly inclined hinged cover constituting a roof, extending over all of said compartments, the beam and trigger mechanisms being wholly inclosed within said box beneath said cover, the rear end of said beam being bent downwardly at an angle and located under the highest portion of the roof, thus insuring an ample clearance between said beam and roof.

2. A trap comprising a box having a horizontal partition dividing it into upper and lower chambers, said lower chamber having a plurality of compartments and a door for each compartment, part of said partition being formed of wire mesh, and trigger mechanism for said doors, said mechanism including hooked triggers extending through and engaging said wire mesh.

3. A trap comprising a box, a gravity door, a beam and a trigger for said door, a post for supporting the beam, said beam having an arc-shaped portion engaging said post to prevent longitudinal sliding thereof when the trigger is set, and a cover inclosing the door, beam and trigger mechanism, the rear end of the beam being bent downwardly at an angle, to prevent interference with said beam by said cover.

In testimony whereof I have affixed my signature.

SAM TAYLOR.